United States Patent [19]
Hahn

[11] Patent Number: 6,012,855
[45] Date of Patent: *Jan. 11, 2000

[54] METHOD AND APPARATUS FOR PARALLEL OPTICAL DATA LINK

[75] Inventor: Kenneth H. Hahn, Cupertino, Calif.

[73] Assignee: Hewlett-Packard Co., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/412,251

[22] Filed: Mar. 28, 1995

Related U.S. Application Data

[63] Continuation-in-part of application No. 08/299,176, Aug. 31, 1994, which is a continuation-in-part of application No. 08/150,648, Nov. 9, 1993.

[51] Int. Cl.$^7$ .............................. G02B 6/36; G02B 6/42
[52] U.S. Cl. ............................ 385/89; 385/88; 385/90; 385/91; 385/92; 385/24; 385/146
[58] Field of Search ...................... 385/88, 89, 90, 385/91, 92, 24, 146

[56] References Cited

U.S. PATENT DOCUMENTS

| | | | |
|---|---|---|---|
| 4,688,884 | 8/1987 | Scifres et al. | 350/96.15 |
| 4,802,727 | 2/1989 | Stanley | 385/89 |
| 5,022,043 | 6/1991 | Jacobs | 372/71 |
| 5,077,814 | 12/1991 | Shigematsu et al. | 385/24 |
| 5,093,879 | 3/1992 | Bregman et al. | 385/89 |
| 5,138,677 | 8/1992 | O'Shaughnessy et al. | 385/89 |
| 5,187,761 | 2/1993 | Mehadji et al. | 385/76 |
| 5,333,218 | 7/1994 | Ortiz, Jr. | 385/88 |
| 5,345,527 | 9/1994 | Lebby et al. | 385/114 |
| 5,371,820 | 12/1994 | Welbourn et al. | 385/88 |
| 5,388,171 | 2/1995 | Michikoshi et al. | 385/88 |
| 5,448,661 | 9/1995 | Takai et al. | 385/24 |
| 5,462,700 | 10/1995 | Beeson et al. | 385/146 |
| 5,579,426 | 11/1996 | Li et al. | 385/88 |
| 5,606,165 | 2/1997 | Chiou et al. | 250/363.06 |

FOREIGN PATENT DOCUMENTS

| | | | |
|---|---|---|---|
| 0 424 913 | 5/1991 | European Pat. Off. | 6/28 |
| 0 486 175 | 5/1992 | European Pat. Off. | 6/42 |
| 0 506 438 | 9/1992 | European Pat. Off. | 6/42 |

OTHER PUBLICATIONS

Daniel Schwartz et al., "A Low Cost, High Performance Optical Interconnect", Feb. 27, 1995, pp. 376–379.

*Primary Examiner*—Rodney Bovernick
*Assistant Examiner*—Sung T. Kim
*Attorney, Agent, or Firm*—Jack Lenell

[57] ABSTRACT

A parallel optical data link using multimode optical components. The invention includes an array of photonic optical sources and an array of multimode waveguides optically coupled adjacent to the array of sources. Similarly, the invention further includes an array of photonic optical detectors and an array of multimode waveguides optically coupled adjacent to the array of detectors. The invention further includes a multimode optical fiber ribbon having a longitudinal dimension and first and second opposing extremities for transmission of light there through. The source coupled waveguide array is in optical communication with the first extremity of the fiber ribbon, while the detector coupled waveguide array is in optical communication with the second extremity of the fiber ribbon. Since the present invention transmits data over a parallel optical link, the invention does not limit data transmission speed to the capacity of just one fiber and the associated source and detector, as in previously known serial data links. Furthermore, since the present invention uses multimode components such as multimode optical waveguides and multimode optical fibers, the invention is not as vulnerable to optical misalignment, as in previously known serial data links using single mode fibers.

18 Claims, 13 Drawing Sheets

METHOD AND APPARATUS FOR PARALLEL OPTICAL DATA LINK

CROSS REFERENCE TO RELATED APPLICATIONS

This is a continuation in part of co-pending U.S. patent application Ser. No. 08/299,176 filed Aug. 31, 1994 entitled "Passive Alignment and Packaging of Optoelectronic Components to Optical Waveguides Using Flip-Chip Bonding Technology" filed Aug. 31, 1994, which in turn is a continuation in part of co-pending U.S. patent application Ser No. 08/150,648 filed Nov. 9, 1993 entitled "Optical Detectors and Sources with Merged Holographic Optical Elements Suitable for Optoelectronic Interconnects".

FIELD OF THE INVENTION

The present invention generally relates to optical data links, and more particularly relates to parallel optical data links.

BACKGROUND OF THE INVENTION

Serial optical data links are well known in the art. Typically, in a serial optical data link, a single mode optical fiber is used to provide optical coupling between a single mode laser source and a detector. Since data is transmitted serially over just one fiber, the speed of this type of previously known data link is limited to the capacity of the one fiber and the associated source and detector. Greater data transmission speed is needed than that which is provided by presently available and affordable serial optical data links. Unfortunately, increasing speed of serial data links is a costly proposition. Furthermore, single mode fibers are especially vulnerable to optical mis-alignment with sources and detectors, further adding to cost of previously known serial data links.

What is needed is a parallel optical data link using multimode optical components.

SUMMARY OF THE INVENTION

The present invention provides a method and apparatus for a parallel optical data link using multimode optical components. Since the present invention transmits data over a parallel optical link, the invention does not limit data transmission speed to the capacity of just one fiber and the associated source and detector, as in previously known serial data links. Furthermore, since the present invention uses multimode components such as multimode optical waveguides and multimode optical fibers, the invention is not as vulnerable to optical mis-alignment, as in previously known serial data links using single mode fibers. Packaging costs are amortized over many data channels, making the parallel optical data link of the invention less costly per data channel than serial data link alternatives.

Briefly, and in general terms, the invention includes an array of photonic optical sources and an array of multimode waveguides optically coupled adjacent to the array of sources. Similarly, the invention further includes an array of photonic optical detectors and an array of multimode waveguides optically coupled adjacent to the array of detectors. The invention further includes a multimode optical fiber ribbon having a longitudinal dimension and first and second opposing extremities for transmission of light there through. The source coupled waveguide array is in optical communication with the first extremity of the fiber ribbon, while the detector coupled waveguide array is in optical communication with the second extremity of the fiber ribbon.

At every interface between adjacent optical components, the invention provides coupling efficiency and alignment tolerance by controlling tapering, pitch of the components, optical aperture size, and numerical aperture. Accordingly, the invention provides for optimization of optical alignment and optical coupling beyond what is provided by the prior art. In particular, each of the multimode optical waveguides are tapered in a respective funnel like arrangement to provide for coupling efficiency and increased alignment tolerances of the waveguide arrays. In accordance with the preferred embodiment of the invention, waveguides of the source coupled array are tapered to have selected dimensions, and waveguides of the detector coupled array are tapered to have dimensions that are substantially different than those of waveguides in the source coupled array. This difference in dimensions of the waveguides satisfies not only the differing optical alignment requirements of the sources or detectors, but further satisfies the differing alignment requirements of the opposing extremities of the optical fibers of the ribbon.

Control of pitch of the optical components in the invention also promotes optical alignment and efficient optical transmission. Since the pitch of optical fibers of the ribbon is substantially different than the pitch of the array of sources, the input apertures of the source coupled waveguides have a selected pitch that substantially matches the pitch of the of the sources, while the output apertures of the source coupled waveguide array have a selected pitch that substantially matches the pitch of the of the fibers of the ribbon. In the preferred embodiment, the array of waveguides coupled with the sources are arranged so that the waveguides fan in from the sources towards the fibers.

Similarly, since the pitch of the optical fibers of the ribbon is substantially different than the pitch of the array of detectors, the input apertures of the detector coupled waveguides have a selected pitch that substantially matches the pitch of the fibers, while the output apertures of the detector coupled waveguides have a selected pitch that substantially matches the pitch of the array of detectors. In the preferred embodiment, the array of waveguides coupled with the detectors are arranged so that the waveguides fan out from the fibers towards the detectors.

Since the optical aperture size and numerical aperture of the optical fibers is substantially different than the optical aperture size and numerical aperture of the sources, the source coupled waveguides each have optical aperture sizes and a numerical aperture value selected so as to provide optical alignment and efficient optical transmission. In particular, the selected numerical aperture value of the source coupled waveguide array is between that of the sources and that of the fibers. Furthermore, since optical aperture size and the numerical aperture of the detectors is substantially different than optical aperture size and the numerical aperture of the optical fibers, the detector coupled waveguides each have optical aperture sizes and a numerical aperture value selected so as to provide optical alignment and efficient optical transmission. In particular, the selected numerical aperture value of the detector coupled waveguide array is substantially between that of the fibers and that of the detectors.

In the preferred embodiment a first and second fiber ribbon ferrule are mechanically coupled with the opposing extremities of the fiber ribbon. In addition to the first fiber ribbon ferrule coupled with the first extremity of the fiber ribbon, there is also a means for holding the first ferrule in alignment with the waveguide array that is coupled to the sources, so as to substantially provide a desired optical alignment of the first extremity of the fiber ribbon with the waveguide array. The alignment means preferably comprises a cavity extending into an extremity of the waveguide array for receiving an alignment guide pin mechanically coupled with the first ferrule. A similar type of arrangement provides for alignment of a second fiber ribbon ferrule with the waveguide array that is coupled with the sources. In another preferred embodiment the alignment means comprises a passive alignment means for matching fiducial features of the ferrule with fiducial features of the waveguide. In yet another preferred embodiment, the alignment means comprises an active alignment means for adjusting position of the ferrule in response to a position dependent peak optical signal transmission between the waveguide and the ferrule.

Other aspects and advantages of the invention will become apparent from the following detailed description, taken in conjunction with the accompanying drawings, illustrating by way of example the principles of the invention.

DETAILED DESCRIPTION OF PREFERRED EMBODIMENT

Figure 1:
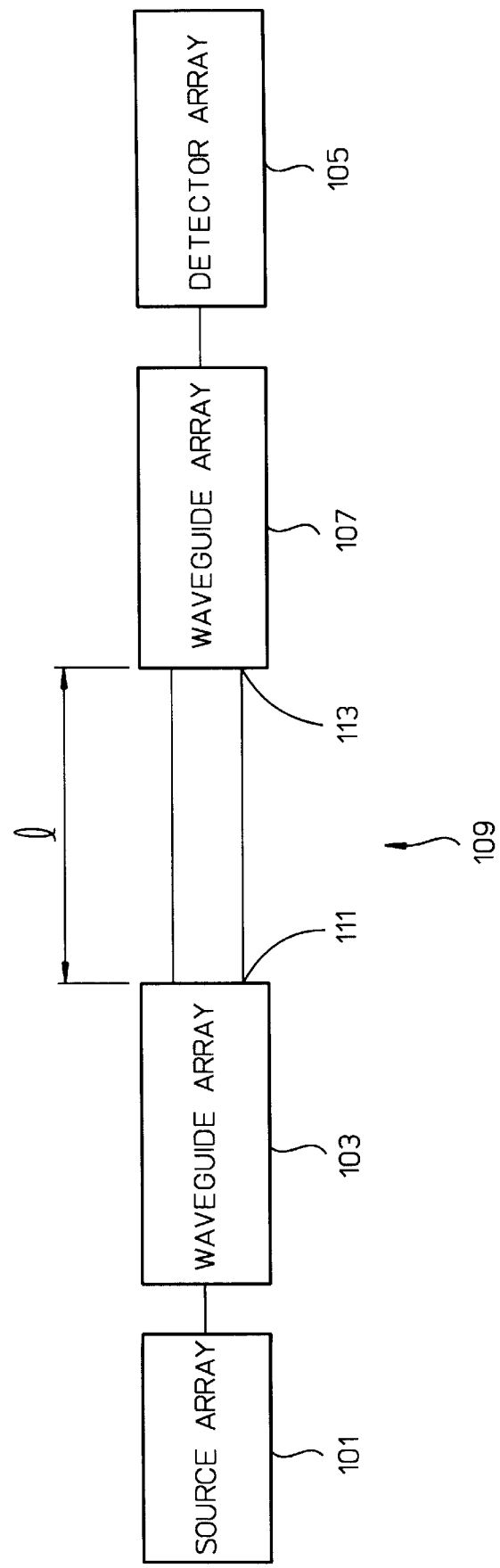
FIG. 1 is a partial block diagram of a preferred embodiment of the parallel optical data link of the invention.

As shown in the partial block diagram of FIG. 1, the invention includes an array of photonic optical sources 101 and an array of multimode waveguides 103 optically coupled adjacent to the array of sources. Similarly, the invention further includes an array of photonic optical detectors 105 and an array of multimode waveguides 107 optically coupled adjacent to the array of detectors. The invention further includes one or more multimode optical fiber ribbon 109 having a longitudinal dimension, I, and first and second opposing extremities 111, 113 for transmission of light there through. The source coupled waveguide array is in optical communication with the first extremity of the fiber ribbon, while the detector coupled waveguide array is in optical communication with the second extremity of the fiber ribbon.

As explained in greater detail subsequently herein, the waveguides of the invention are advantageously tapered. Such tapering is especially useful for parallel data channel operation in an optical data link between the array of sources and the array of detectors, since lateral alignment tolerance is particularly advantageous for arrays including many data channels of sources or detectors laterally arranged in arrays of one or more rows as in the preferred embodiment. For example, the tapering provides lateral alignment tolerance so as to maintain the desired optical alignment despite thermal expansion of the waveguides.

FIGS. 2, 2A, 2B, 3, 3A, and 3B show various views the source coupled waveguide array of the parallel optical link of the invention. Preferably, the waveguides of the array are defined by photolithographic techniques, which are well known to those with ordinary skill in the art, using a mask on a single flexible polymer layer. Preferably the polymer layer is then sandwiched between buffer layers as particularly shown in FIGS. 2A and 2B, as well as additional packaging layers (not shown in the figures). Helpful background information is found in patents issued to Bruce L. Booth such as U.S. Pat. No. 5,026,136 entitled "Moisture Sealing of Optical Waveguide Devices with Doped Silicon Dioxide", which is incorporated herein by reference. Suitable doping using selected materials, as well as other processing conditions, control respective refractive indices of the waveguide and buffer layers, which in turn control the numerical aperture of the waveguides. Optically coupled light beams are shown in the figures as dashed lines. As shown, in the preferred embodiment the waveguide array is optically coupled with the source array by reflection at a sloped face at an extremity of the waveguide array.

Figure 2:
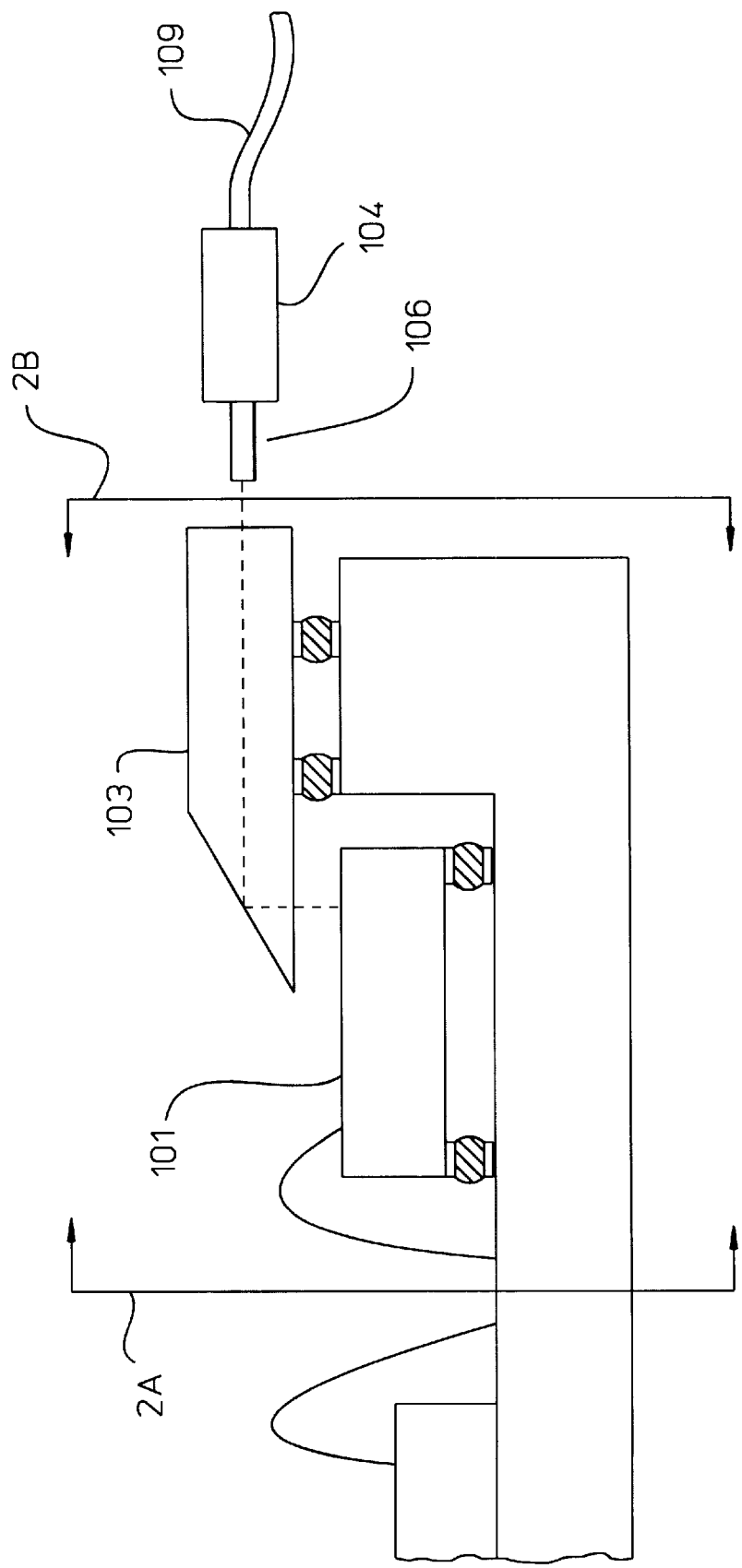
FIGS. 2, 2A, 2B, 3, 3A, and 3B show various views of a source coupled waveguide array of the parallel optical data link of the invention.

In side view, FIG. 2 shows the array of photonic optical sources 101, preferably large area multi-transverse-mode vertical cavity surface emitting lasers. To provide helpful supportive teachings, U.S. Pat. No. 5,359,447 issued Oct. 25, 1994 and entitled "Optical Communication with Vertical-Cavity Surface-Emitting Laser Operating in Multiple Transverse Modes" is hereby incorporated by reference. The large area lasers preferably have a diameter within a range of five to twenty five microns, to promote optical alignment with a preferred size optical input aperture of the source coupled waveguide as discussed in greater detail subsequently herein.

The sources are preferably mounted on a transmitter substrate using solder bump "Flip-Chip" alignment and bonding techniques and electrically coupled to electronic drive circuitry suitable for controlling data transmission along the parallel optical data link. The array of multimode waveguides 103 is optically coupled adjacent to the array of sources, and preferably mounted and aligned on the substrate using solder bump "Flip-Chip" bonding. Helpful teachings in co-pending U.S. patent application Ser. No. 08/299,176 filed Aug. 31, 1994 entitled "Passive Alignment and Packaging of Optoelectronic Components to Optical Waveguides Using Flip-Chip Bonding Technology" filed Aug. 31, 1994 are hereby incorporated by reference. In another preferred embodiment passive alignment is achieved by matching fiducial features of the sources with fiducial features of the waveguides. In yet another preferred embodiment, active alignment is achieved by adjusting position of the waveguides in response to a position dependent peak optical signal transmission between the waveguides and the sources.

In the preferred embodiment, a first fiber ribbon ferrule 104 is mechanically coupled with the first extremity of the fiber ribbon 109. Furthermore, as shown in partial exploded side view in FIG. 2, there is a means for holding the first ferrule in alignment with the waveguide array that is coupled to the sources, so as to substantially provide a desired optical alignment of the first extremity of the fiber ribbon with the waveguide array. The alignment means preferably comprises a cavity extending into an extremity of the waveguide array for receiving an alignment guide pin 106 mechanically coupled with the first ferrule.

The numerical aperture of the optical fibers is substantially different than the numerical aperture of the sources. For example, in the preferred embodiment of the invention, the optical sources have a numerical aperture of approximately 0.1, while the fiber has a relatively higher numerical aperture of approximately 0.28. The source coupled waveguide array has a selected numerical aperture that is between that of the sources and that of the fibers, so as to promote efficient optical transmission from the sources through the waveguides and to the optical fibers. For example, in the preferred embodiment of the invention, the materials of the source coupled waveguides and the materials of the associated buffer layers are selected so that the source coupled waveguides have a numerical aperture of approximately 0.2.

Each waveguide of the source coupled array has a respective pair of optical apertures positioned at opposing extremities of the waveguide, comprising an input aperture and an output aperture. As shown in front view in FIG. 2A, in the preferred embodiment, the respective input aperture 110 of each source coupled waveguide of the array has a preferred increased size of approximately fifty microns vertical by sixty microns lateral. The sixty micron lateral dimension of the input optical aperture of the waveguide provides for the preferred increased size of the optical aperture, and further provides for increased alignment tolerances along a lateral dimension, L1, of the waveguide array for coupling to the photonic sources. A preferred pitch of five hundred microns is matched by members of the array of sources and the input apertures of the waveguide array. Although for the sake of simplicity the array of sources and the array of waveguides are each shown as having only three members, it should be understood that a larger number of members, for example, ten members is preferred.

Each of the waveguides of the source coupled array is preferably tapered so that the output aperture of the source coupled waveguide has a preferred reduced size of approximately forty microns lateral by fifty microns vertical. Despite the tapering, there is still efficient light transmission from the sources through the guide. The inventor theorizes that high initial transmission loss would occur at tapering of the waveguides if the waveguides were mode-filled. Since the sources are small and have low numerical aperture relative to the size and numerical aperture of the input apertures of the waveguides, there is a lack of initial mode fill of the waveguide by the photonic sources, which minimizes any deleterious effects of the tapering.

Figure 2A:
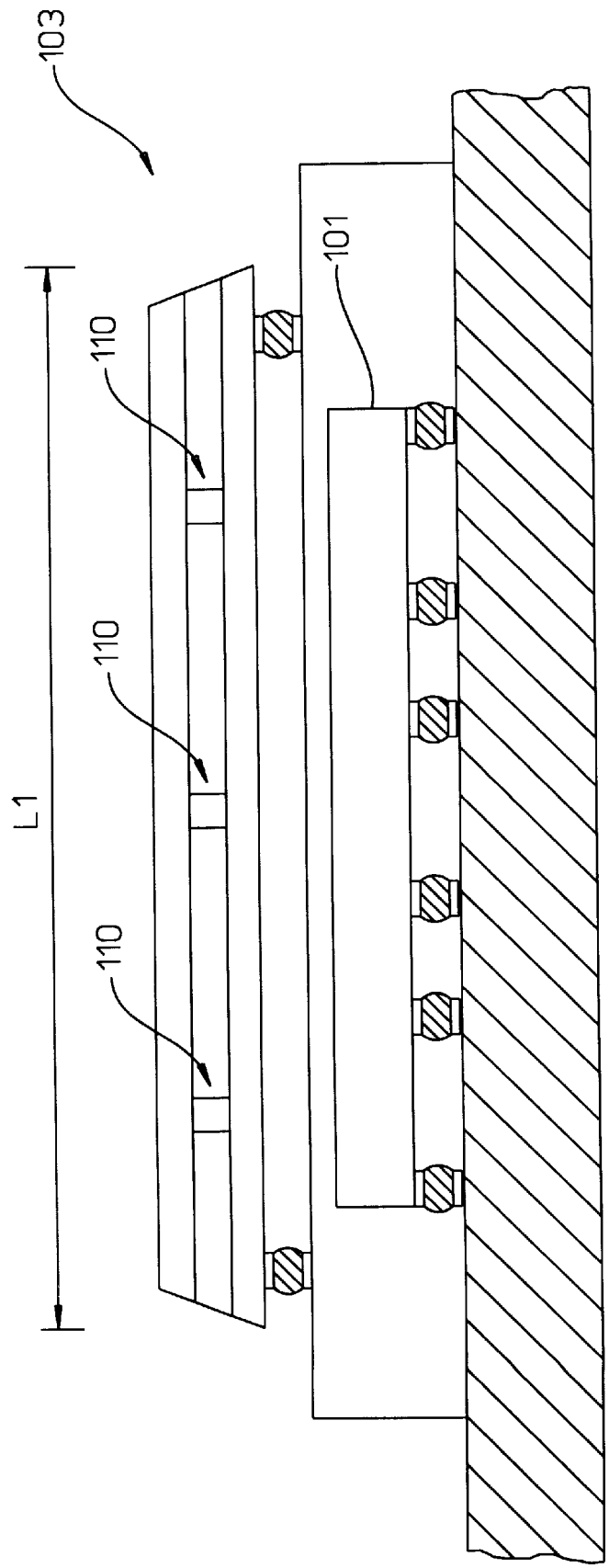
Figure 2B:
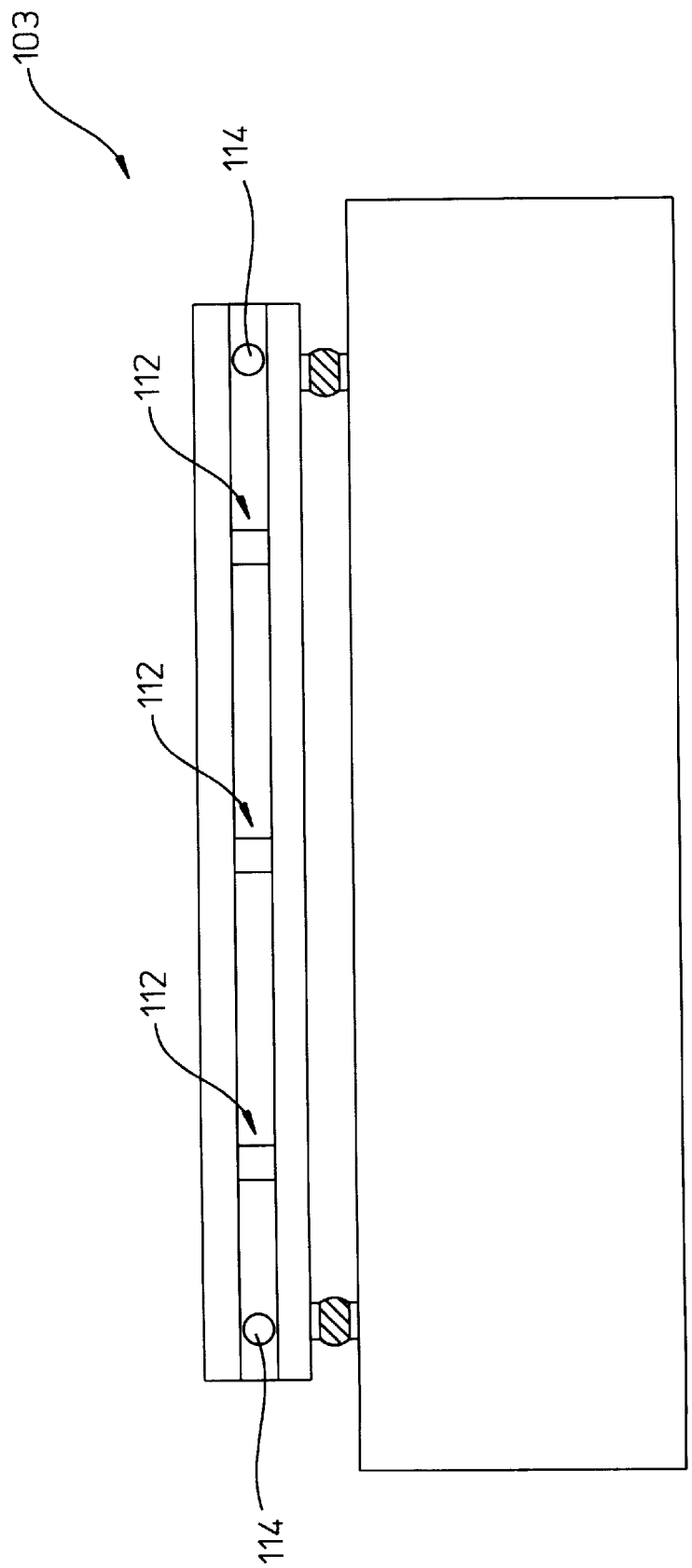

The reduced size of the output aperture 112 of the source coupled waveguide particularly shown in rear view in FIG. 2B provides for good alignment tolerance and efficient optical coupling to input optical apertures at the first extremity of 62.5/125 micron graded index fibers of the ribbon. A preferred decreased pitch of two hundred and fifty microns is matched by fibers of the ribbon and the output apertures of the waveguide array. Accordingly, lateral arrangement of the source coupled waveguide fans in from the pitch at the input apertures to provide the decreased pitch at the output apertures. The alignment pins are received by the cavities 114 extending into the extremity of the waveguide array, as particularly shown in the rear view of FIG. 2B. A preferred method of making the cavities is laser ablation.

Figure 3B:
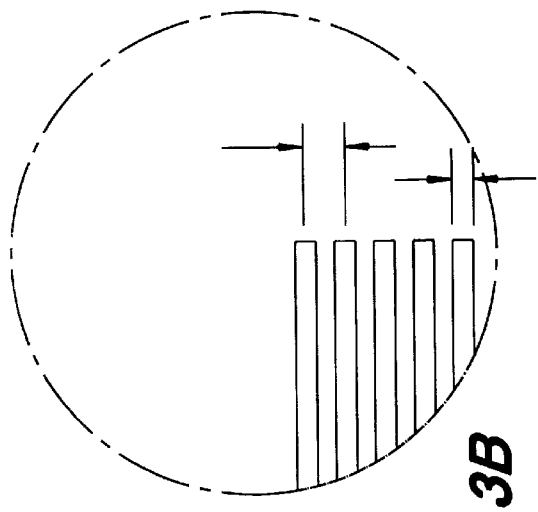
Figure 3A:
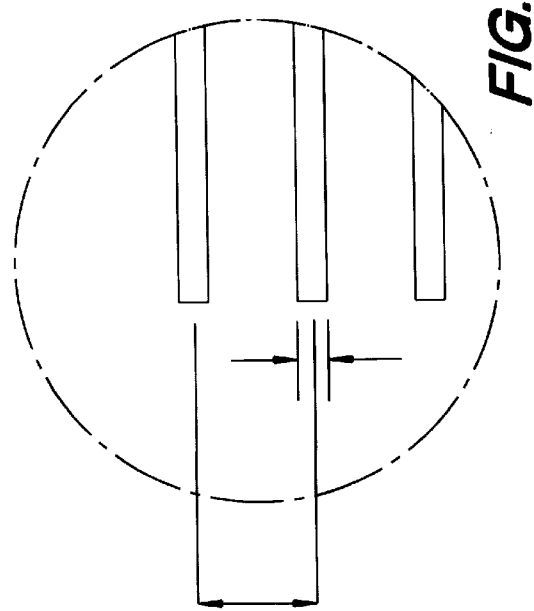
Figure 3:
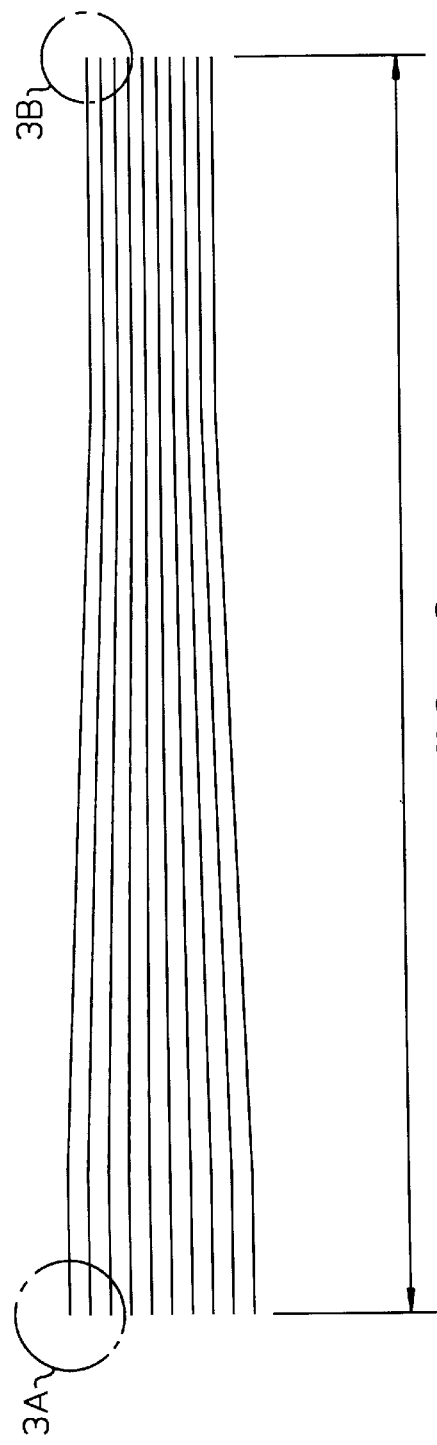

FIG. 3 is a plan view of the source coupled waveguide array having a length dimension, wherein the buffer layers of the waveguide array are cut away. The length dimension of the source coupled waveguide is within a range of dimensions greater than approximately one millimeter, so as to provide sufficient length for waveguide tapering, and less than thirty centimeters, so as to provide less than approximately three decibels of attenuation within the waveguide at relevant light wavelengths of interest. The preferred length dimension is approximately thirty four millimeters.

It should be understood that while for the sake of simplicity the array of waveguides in FIG. 2, 2A and 2B is shown as having only three members, the preferred ten members of the source coupled waveguide array are shown in FIG. 3. In the preferred embodiment, the array of waveguides coupled with the sources are arranged so that the waveguides fan in as shown in FIG. 3 from the sources towards the fibers.

FIG. 3A particularly shows pitch and lateral dimension of the optical input aperture in a detailed cut away plan view of the source coupled waveguide array. As pointed out previously herein, the lateral dimension of the input aperture of the waveguide is approximately sixty microns so as to provide for the preferred increased size of the input aperture, and further provides for increased alignment tolerances along the lateral dimension of the waveguide array for coupling to the photonic sources. As also pointed out previously herein, the pitch of members of the array of sources and the pitch of the input apertures of the waveguide array are matched at the preferred pitch of approximately five hundred microns.

FIG. 3B particularly shows pitch and lateral dimension of the optical output aperture in a detailed cut away plan view of the source coupled waveguide array. The lateral dimension of the output optical aperture of the waveguide is approximately forty microns so as to provide for the preferred decreased size of the output aperture, and further provides for increased alignment tolerances along the lateral dimension of the waveguide for coupling to the optical fibers. As also pointed out previously herein, the pitch of the optical fibers and the pitch of the output apertures of the waveguide array are matched at the preferred pitch of approximately two hundred and fifty microns.

Figure 4:
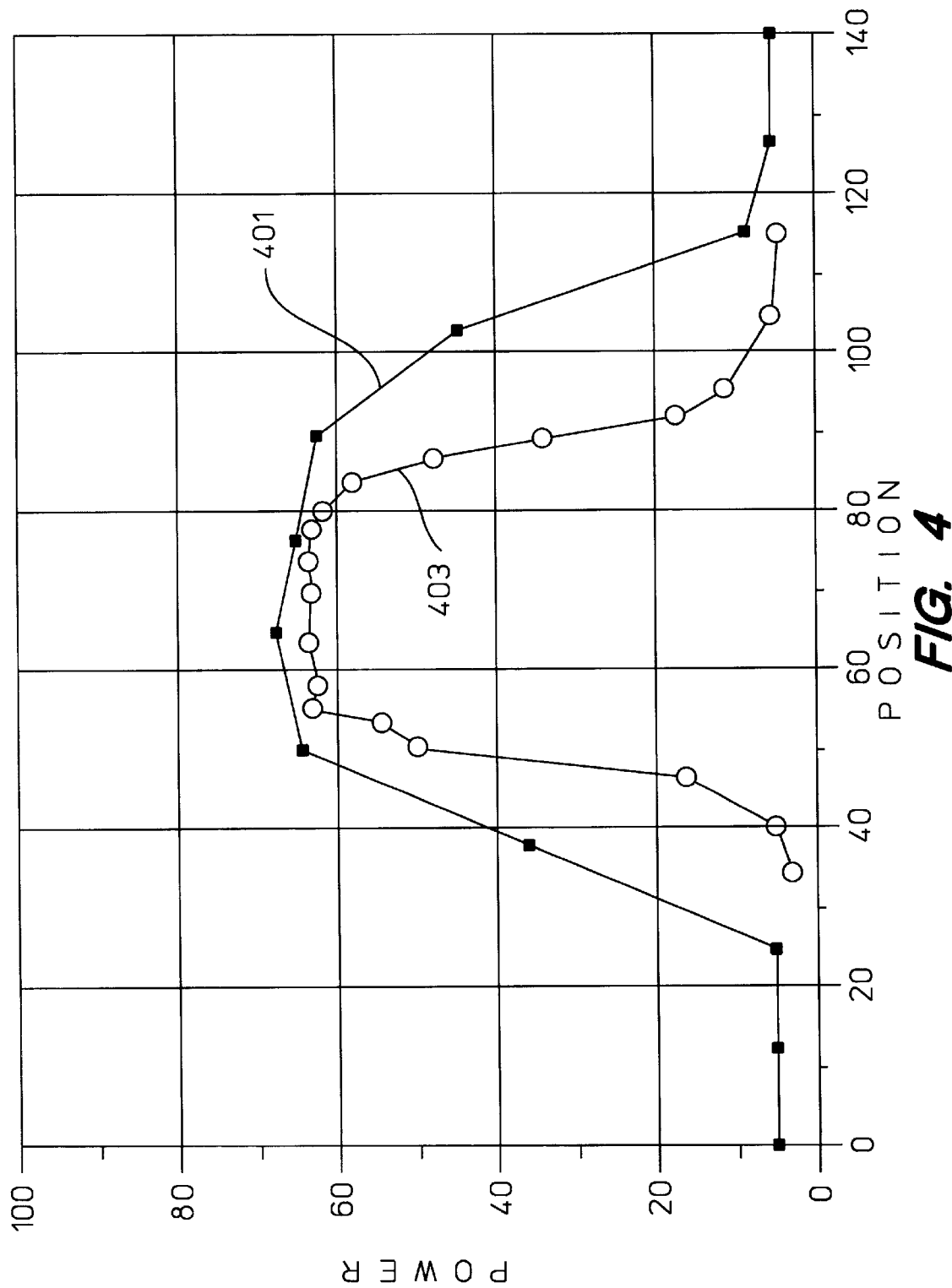
FIG. 4 is a graph of optical power transmission versus position of an optical source relative to an input aperture of the source coupled waveguide.

FIG. 4 is a graph of optical power transmission versus position of the optical source relative to the input aperture of the source coupled waveguide. A trace 401 of the graph shows optical power transmission into the tapered guide of the invention in normalized units versus the lateral position of the guide in microns. For sake of comparison, another trace 403 of the graph shows optical power transmission into an un-tapered guide versus the lateral position of the un-tapered guide. As shown, the tapering of the waveguides and the preferred increased size of the input aperture provide for increased alignment tolerances along the lateral dimension of the waveguide array for coupling to the photonic sources, which is particularly advantageous for arrays including many data channels of the source array laterally. Furthermore, the tapering of the waveguides and the preferred increased size of the input aperture provide for increased alignment tolerance at the input aperture, without sacrificing alignment tolerance at the output aperture.

FIGS. 5, 5A, 5B, 6, 6A, and 6B show various views of the detector coupled waveguide array of the parallel optical data link of the invention. Optically coupled light beams are shown in the figures as dashed lines. As shown, in the preferred embodiment the waveguide array is optically coupled with detector array by reflection at a sloped face at an extremity of the waveguide array.

Figure 5:
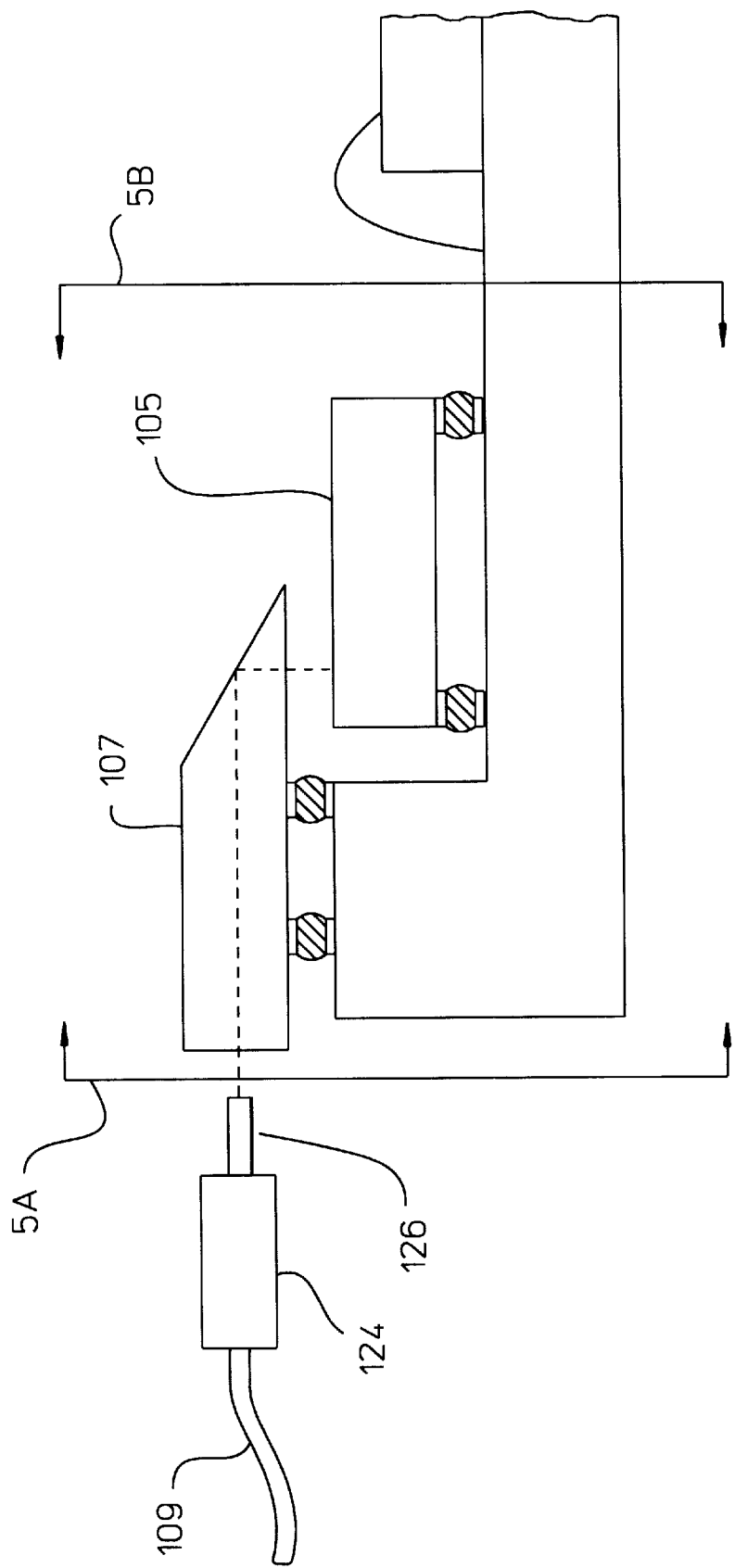
FIGS. 5, 5A, 5B, 6, 6A, and 6B show various views of a detector coupled waveguide array of the parallel optical data link of the invention.

In side view, FIG. 5 shows the array of photonic optical detectors 105, preferably P-I-N type photodiode detectors, mounted on a receiver substrate using solder bump "Flip-Chip" alignment and bonding techniques, and electrically coupled to electronic sensing circuitry suitable for controlling data reception along the parallel optical data link. The array of multimode waveguides 107 is optically coupled adjacent to the array of detectors and preferably mounted on the substrate using solder bump "Flip-Chip" bonding. In another preferred embodiment passive alignment is achieved by matching fiducial features of the detectors with fiducial features of the waveguides. In yet another preferred embodiment, active alignment is achieved by adjusting position of the waveguides in response to a position dependent peak optical signal transmission between the waveguides and the detectors.

In the preferred embodiment, a second fiber ribbon ferrule 124 is mechanically coupled with the second extremity of the fiber ribbon 109. Furthermore, as shown in partial exploded side view in FIG. 5, there is a means for holding the second ferrule in alignment with the waveguide array that is coupled to the detectors, so as to substantially provide a desired optical alignment of the second extremity of the fiber ribbon with the waveguide array. The alignment means preferably comprises a cavity extending into an extremity of the waveguide array for receiving an alignment guide pin 126 mechanically coupled with the second ferrule. In another preferred embodiment the alignment means comprises a passive alignment means for matching fiducial features of the ferrule with fiducial features of the waveguide. In yet another preferred embodiment, the alignment means comprises an active alignment means for adjusting position of the ferrule in response to a position dependent peak optical signal transmission between the waveguide and the ferrule.

The numerical aperture of the detectors is substantially different than the numerical aperture of the optical fibers. For example, in the preferred embodiment the numerical aperture of the detectors is much greater than 0.4, while the numerical aperture of the fibers is approximately 0.28, which is substantially less. The detector coupled waveguide array has a selected numerical aperture that is substantially between that of the fibers and that of the detectors, so as to promote efficient optical transmission from the fibers through the waveguides and to the detectors. For example, in the preferred embodiment of the invention, the materials of the detector coupled waveguides and the materials of the associated buffer layers are selected so that the detector coupled waveguides have a numerical aperture of approximately 0.30.

Each detector coupled waveguide has a pair of optical apertures positioned at opposing extremities of the waveguide, comprising an input aperture and an output aperture. As shown in front view in FIG. 5A, the input aperture 120 of the detector coupled waveguide has a preferred increased size of approximately fifty five microns vertical by sixty microns lateral. The sixty micron lateral dimension of the input optical aperture of the waveguide provides for the preferred increased size of the optical aperture, and further provides for increased alignment tolerances in a lateral dimension L2 of the waveguide array for coupling to the photonic detectors. A preferred pitch two hundred and fifty microns is matched by fibers of the ribbon and the input apertures of the waveguide array. The alignment pins are received by the cavities 134 in the extremity of the waveguide array, as particularly shown in the front view of FIG. 5A.

Figure 5A:
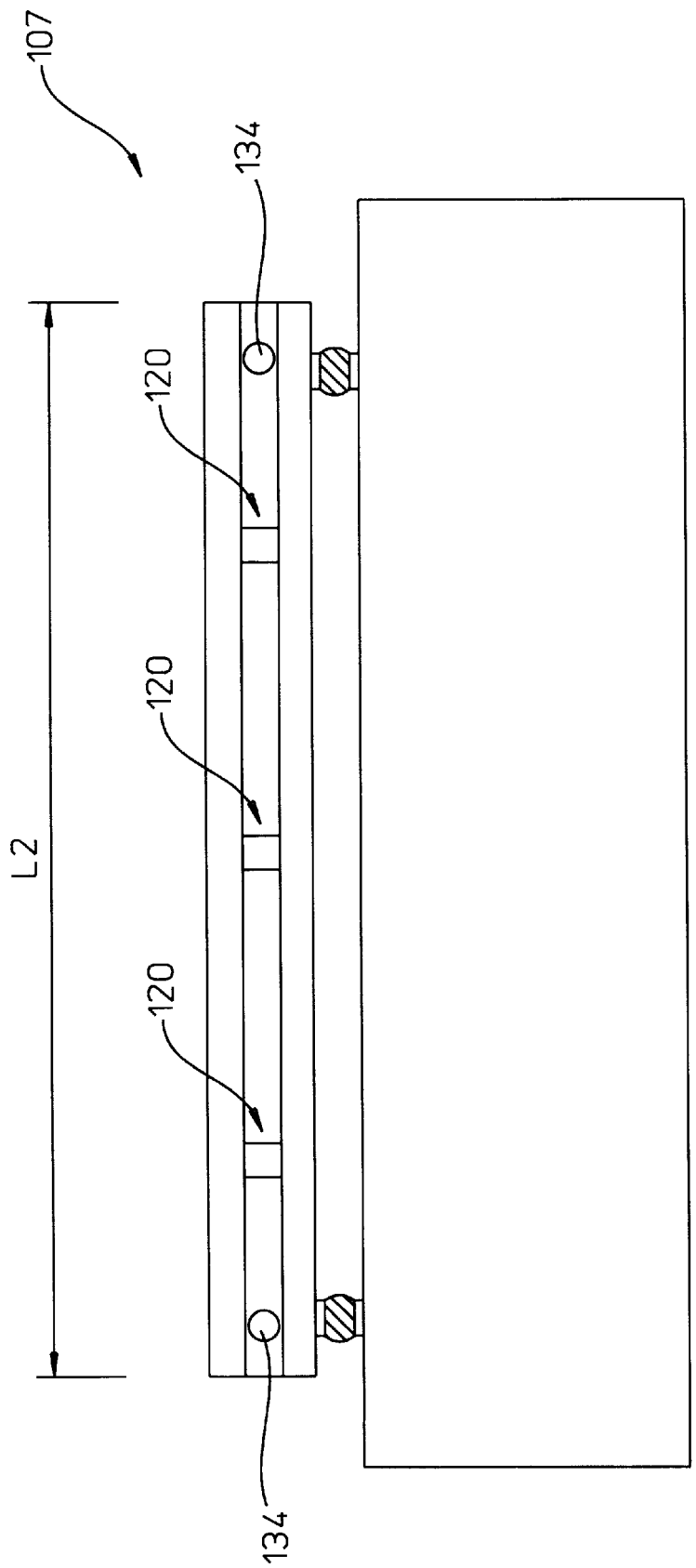
Figure 5B:
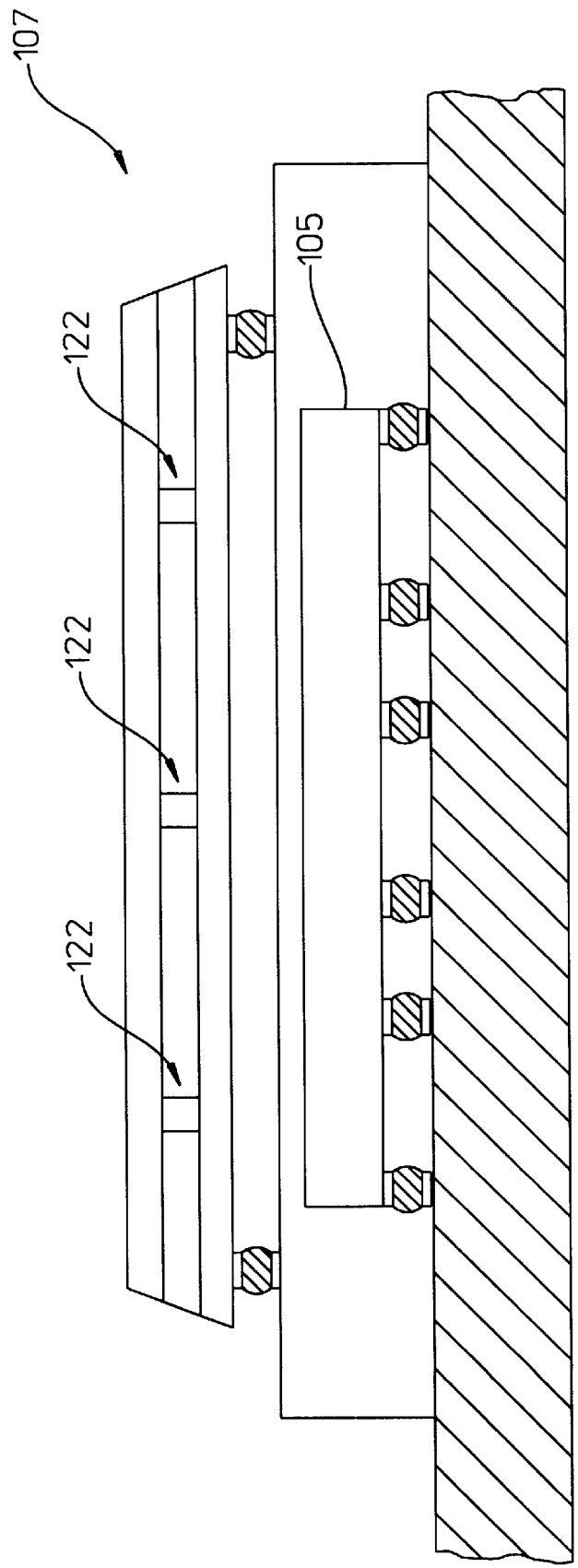

The detector coupled waveguide is preferably tapered so that the respective output aperture 122 of each of the detector coupled waveguides of the array has a preferred reduced size of approximately fifty microns lateral by fifty five microns vertical, as shown in rear view of FIG. 5B. The reduced size of the output aperture of the waveguide provides for good alignment tolerance and efficient optical coupling with a ninety micron detector. A preferred increased pitch of approximately three hundred and sixty microns is matched by members of the array of detectors and the output apertures of the waveguide array. Accordingly, lateral arrangement of the detector coupled waveguide fans out from the pitch at the input apertures to provide the increased pitch at the output apertures. Despite the tapering, there is still efficient light transmission from through the guide to the detectors.

As discussed herein, the waveguide arrays of the invention provide for increased coupling efficiency and alignment tolerances by tapering each of the multimode optical waveguides in a respective funnel like arrangement. Furthermore, it should be understood from the figures and previous discussions that waveguides of the detector coupled array are tapered to have selected dimensions and that waveguides of the detector coupled array are tapered to have dimensions that are substantially different than those of waveguides in the source coupled array. This difference in dimensions is due not only to matching differing pitch requirements of the array of sources and the array of detectors, but is also due to different input and output matching requirements of fiber diameter and numerical aperture.

Figure 6B:
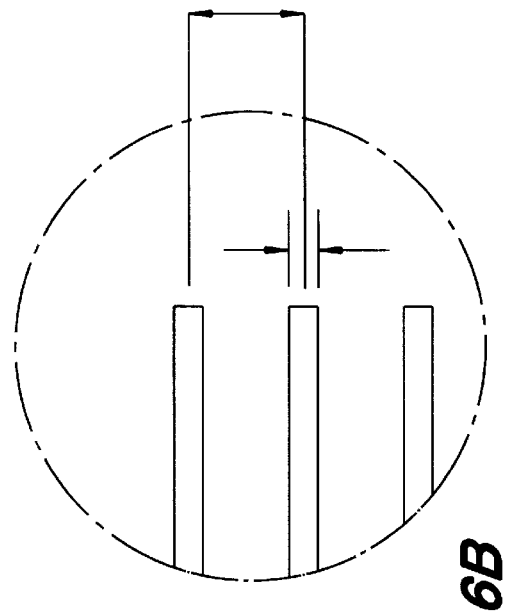
Figure 6A:
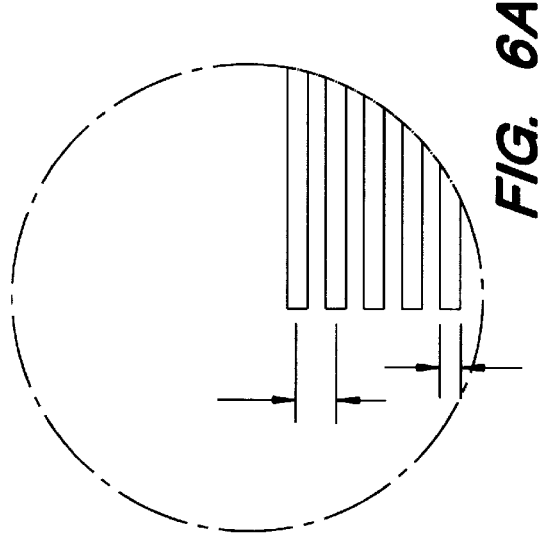
Figure 6:
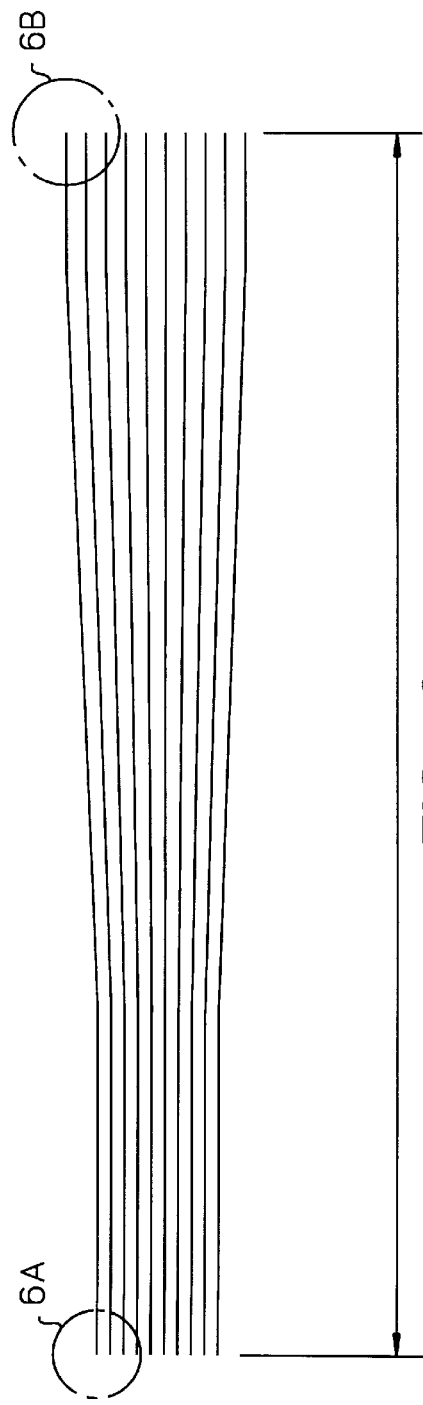

FIG. 6 is a plan view of the detector coupled waveguide array having a length dimension, wherein the buffer layers of the waveguide array are cut away. The preferred length dimension is approximately thirty four millimeters. It should be understood that while for the sake of simplicity the array of waveguides in FIG. 5, 5A and 5B is shown as having only three members, the preferred ten members of the detector coupled waveguide array are shown in FIG. 6. In the preferred embodiment, the array of waveguides coupled with the detectors are arranged so that the waveguides fan out as shown in FIG. 6 from the fibers towards the detectors.

FIG. 6A particularly shows pitch and lateral dimension of the optical input aperture in a detailed cut away plan view of the detector coupled waveguide array. As pointed out previously herein, the lateral dimension of the input aperture of the waveguide is approximately sixty microns so as to provide for the preferred increased size of the input aperture, and further provides for increased alignment tolerances along the lateral dimension of the waveguide array for coupling to the optical fibers of the ribbon. As also pointed out previously herein, the pitch of the fibers of the ribbon and the pitch of the input apertures of the waveguide array are matched at the preferred pitch of approximately two hundred and fifty microns.

FIG. 6B particularly shows pitch and lateral dimension of the optical output aperture in a detailed cut away plan view of the detector coupled waveguide array. The lateral dimension of the output optical aperture of the waveguide is approximately fifty microns so as to provide for the preferred decreased size of the output aperture, and further provides for increased alignment tolerances along the lateral dimension of the waveguide for coupling to the optical fibers. As also pointed out previously herein, the pitch of the optical fibers and the pitch of the output apertures of the waveguide array are matched at the preferred pitch of approximately three hundred and sixty microns.

Figure 7A:
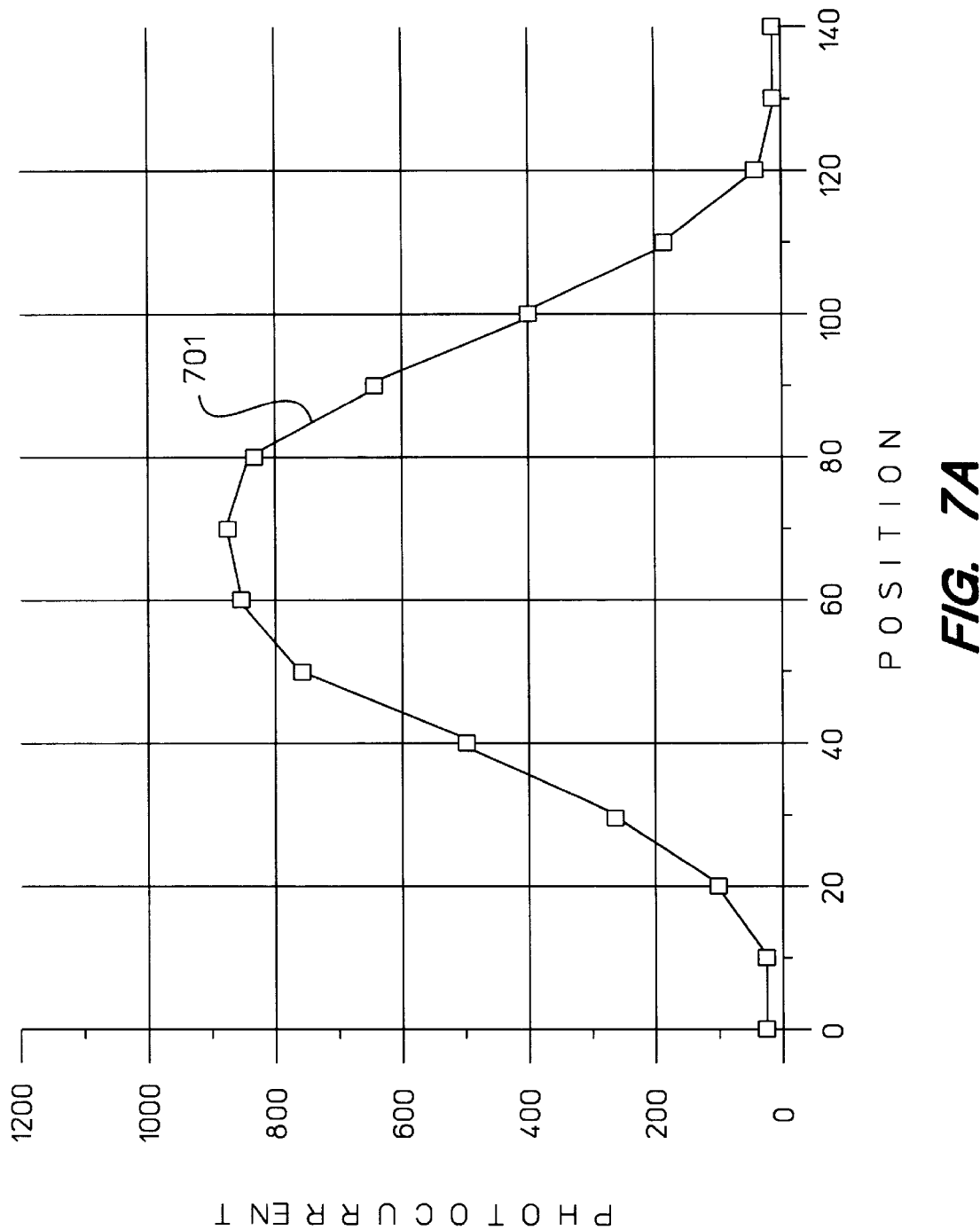
FIG. 7A is a graph of photocurrent versus position of an opposing extremity of the optical fiber relative to an input aperture of the detector coupled waveguide.

FIG. 7A is a graph of photocurrent versus position of an opposing extremity of the optical fiber relative to an input aperture of the detector coupled waveguide. A trace 701 of the graph shows photocurrent of the detector in microamps versus the lateral position in microns. As shown, the tapering of the waveguides and the preferred increased size of the input aperture provide for increased alignment tolerances along the lateral dimension of the waveguide array for coupling to the optical fibers of the ribbon.

Figure 7B:
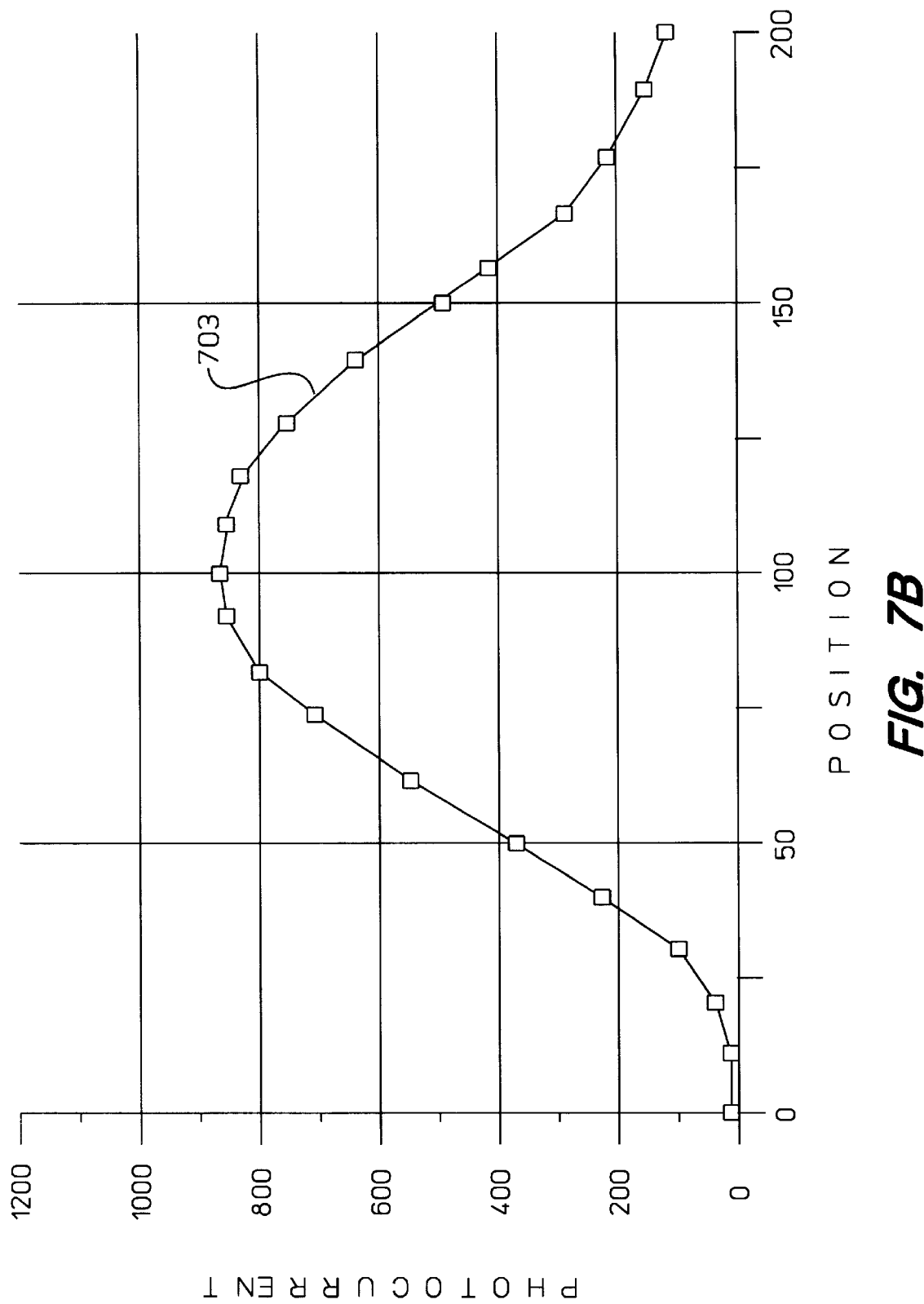
FIG. 7B is a graph of photocurrent versus position of an optical detector relative to an output aperture of the detector coupled waveguide.

FIG. 7B is a graph of photocurrent versus position of an optical detector relative to an output aperture of the detector coupled waveguide. A trace 703 of the graph shows photocurrent of the detector in microamps versus the lateral position in microns. As shown, the tapering of the waveguides and the preferred decreased size of the output aperture provide for increased alignment tolerances along the lateral dimension of the waveguide array for coupling to the photonic detectors, which is particularly advantageous for arrays including many data channels of the detectors laterally arranged in one or more rows.

Figure 8:
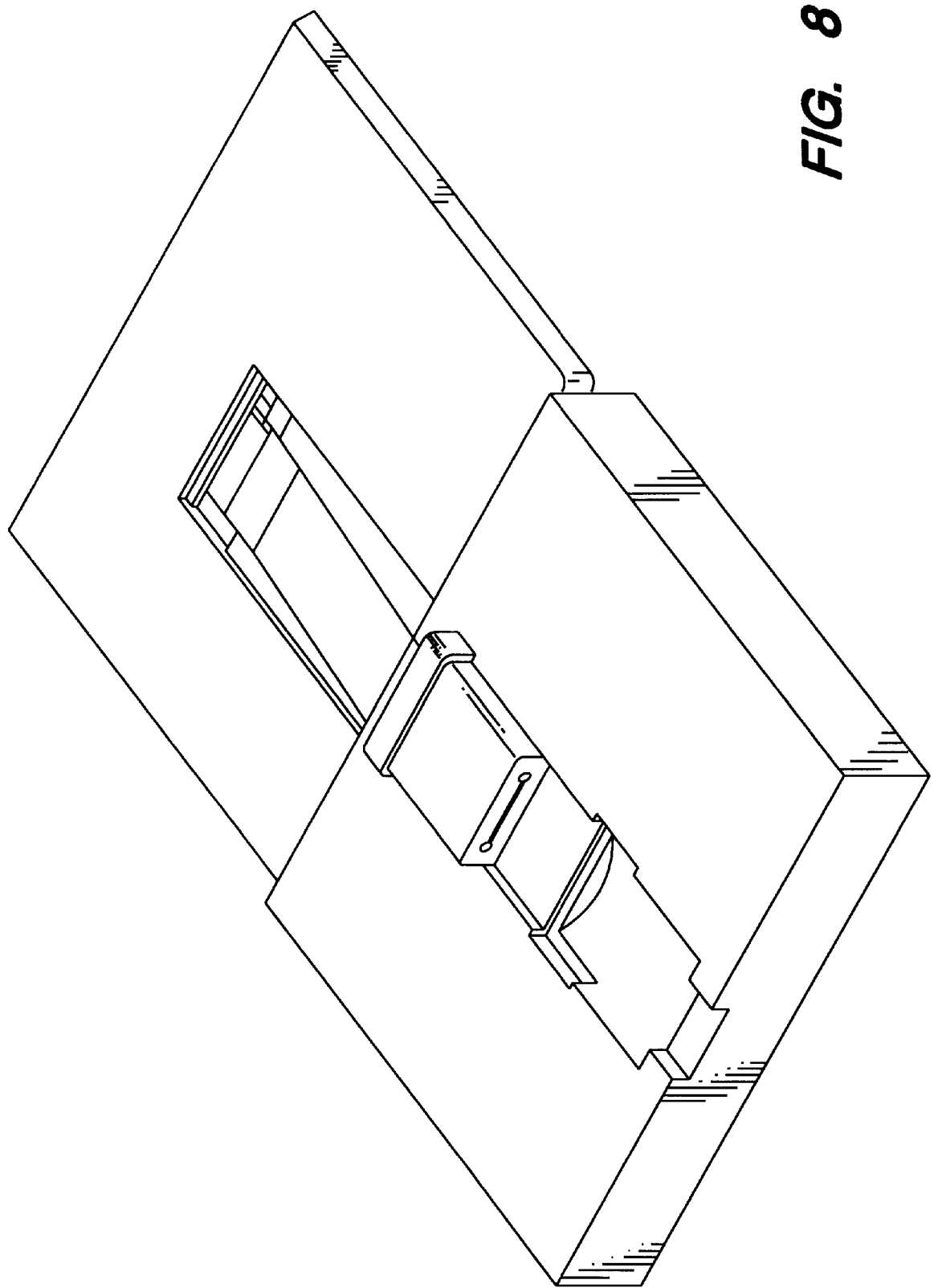
FIG. 8 shows an alternative means for aligning the waveguide array with the fiber ribbon.

FIG. 8 shows an alternative means for aligning the waveguide array with the fiber ribbon. Rather than having cavities extending into an extremity of the waveguide array as in the preferred embodiment, the alternative alignment means shown in FIG. 8 includes a ferrule mechanically coupled to the extremity of the waveguide. The ferrule coupled to the waveguide receives the alignment guide pins of the ferrule coupled with the fiber ribbon.

The present invention provides a parallel optical data link using multimode optical components. Although specific embodiments of the invention have been described and illustrated, the invention is not to be limited to the specific forms or arrangements of parts so described and illustrated, and various modifications and changes can be made without departing from the scope and spirit of the invention. For example in alternative embodiments optical splitters or optical taps are incorporated with the fiber ribbon or elsewhere in the optical data link, so as to provide signal broadcast to multiple data channels. As another example, in alternative embodiments the array of waveguides coupled with the sources are arranged so that the waveguides fan out from the sources towards the fibers, so as to satisfy alternative pitch requirements of the sources and fibers. As yet another example, in alternative embodiments the array of waveguides coupled with the detectors are arranged so that the waveguides fan in from the fibers towards the detectors, so as to satisfy alternative pitch requirements of the fibers and detectors. Within the scope of the appended claims, therefor, the invention may be practiced otherwise than as specifically described and illustrated.

What is claimed is:

1. An apparatus comprising:
    an array of photonic optical sources;
    an array of tapered multimode waveguide cores sandwiched between a pair of buffer layers and arranged so that each of the tapered cores is individually aligned and optically coupled adjacent to a respective member of the array of sources;
    an array of photonic optical detectors;
    an array of tapered multimode waveguide cores sandwiched between another pair of buffer layers and arranged so that each of the tapered cores is individually aligned and optically coupled adjacent to a respective member of the array of detectors;
and
    a multimode optical fiber ribbon having a longitudinal dimension and first and second opposing extremities for transmission of light there through, wherein the source coupled waveguide array is in optical communication with the first extremity of the fiber ribbon and the detector coupled waveguide array is in optical communication with the second extremity of the fiber ribbon, wherein each of the multimode waveguide cores has a respective first optical aperture and a respective opposing optical aperture that are substantially different sizes.

2. An apparatus as in claim 1 wherein each of the multimode waveguide cores are tapered in a respective funnel like arrangement, so as to provide for increased optical coupling efficiency.

3. An apparatus as in claim 1 wherein:
    the waveguide cores of the source coupled array have selected dimensions; and
    waveguide cores of the detector coupled array have dimensions that are substantially different than those of waveguides in the source coupled array.

4. An apparatus as in claim 1 wherein each waveguide core of the source coupled array has a respective pair of optical apertures positioned at opposing extremities of the waveguide core, comprising an input aperture and an output aperture, the input aperture of the source coupled waveguide core being approximately fifty microns by sixty microns, and that the output aperture of the source coupled waveguide core has a preferred reduced size of approximately forty microns by fifty microns.

5. An apparatus as in claim 1 wherein each waveguide core of the detector coupled array has a respective pair of optical apertures positioned at opposing extremities of the waveguide core, comprising an input aperture and an output aperture, the input aperture of the detector coupled waveguide core being approximately fifty five microns by sixty microns, and that the output aperture of the detector coupled waveguide core has a preferred reduced size of approximately fifty microns by fifty five microns.

6. An apparatus as in claim 1 wherein at least one of the multimode waveguides is substantially flexible.

7. An apparatus as in claim 1 wherein at least one of the multimode waveguides comprises an optically transparent plastic polymer.

8. An apparatus as in claim 1 wherein the arrays of waveguide cores sandwiched between the respective pairs of buffer layers each have a length dimension within a range of approximately one millimeter to approximately thirty centimeters.

9. An apparatus comprising:
    an array of photonic optical sources;
    an array of photolithographicly fabricated tapered multimode waveguides optically coupled adjacent to the array of sources;
    an array of photonic optical detectors;
    an array of photolithographicly fabricated tapered multimode waveguides optically coupled adjacent to the array of detectors;
and
    a multimode optical fiber ribbon having a longitudinal dimension and first and second opposing extremities for transmission of light there through, wherein the source coupled waveguide array is in optical communication with the first extremity of the fiber ribbon and the detector coupled waveguide array is in optical communication with the second extremity of the fiber ribbon.

10. An apparatus comprising:
    an array of photonic optical sources;

an array of tapered multimode waveguides optically coupled adjacent to the array of sources;

an array of photonic optical detectors;

an array of tapered multimode waveguides optically coupled adjacent to the array of detectors; and a multimode optical fiber ribbon having a plurality of fibers, each with a respective longitudinal dimension and respective first and second opposing extremities for transmission of light there through, wherein each tapered member of the source coupled waveguide array is arranged in one to one corespondance with the first extremity of a respective fiber of the fiber ribbon and the detector coupled waveguide array is arranged in one to one corespondance with the second extremity of a respective fiber of the fiber ribbon.

11. An apparatus as in claim 1 wherein:

the array of sources have a pitch;

the optical fibers of the ribbon have a pitch that is substantially different than the pitch of the array of sources;

each waveguide core of the source coupled array has a respective pair of optical apertures positioned at opposing extremities of the waveguide core, comprising an input aperture and an output aperture;

the input apertures of the source coupled waveguide array have a selected pitch that substantially matches the pitch of the of the sources; and the output apertures of the source coupled waveguide array have a selected pitch that substantially matches the pitch of the of the fibers of the ribbon.

12. An apparatus as in claim 1 wherein:

the array of sources have a pitch;

the optical fibers of the ribbon have a pitch that is substantially different than the pitch of the array of sources;

the array of waveguide cores coupled with the sources are arranged so that the waveguide cores fan in from the sources towards the fibers.

13. An apparatus as in claim 1 wherein:

the optical fibers of the ribbon have a pitch;

the array of detectors has a pitch that is substantially different than the pitch of the fibers;

each waveguide core of the detector coupled array has a respective pair of optical apertures positioned at opposing extremities of the waveguide, comprising an input aperture and an output aperture;

the input apertures of the detector coupled waveguide array have a selected pitch that substantially matches the pitch of the of the fibers; and the output apertures of the detector coupled waveguide array have a selected pitch that substantially matches the pitch of the of the detectors.

14. An apparatus as in claim 1 wherein:

the optical fibers of the ribbon have a pitch;

the array of detectors has a pitch that is substantially different than the pitch of the fibers;

the array of waveguide cores coupled with the detectors are arranged so that the waveguide cores fan out from the fibers towards the detectors.

15. An apparatus as in claim 1 wherein:

the array of sources have a pitch;

the optical fibers of the ribbon have a pitch that is substantially different than the pitch of the array of sources;

the array of waveguide cores coupled with the sources are arranged so that the waveguide cores fan out from the sources towards the fibers.

16. An apparatus as in claim 1 wherein:

the array of detectors have a pitch;

the optical fibers of the ribbon have a pitch that is substantially different than the pitch of the array of detectors;

the array of waveguide cores coupled with the detectors are arranged so that the waveguide cores fan in from the detectors towards the fibers.

17. An apparatus as in claim 1 further comprising:

a first fiber ferrule having an alignment guide pin and being mechanically coupled with the first extremity of the fiber ribbon; and a cavity extending into the waveguide array for receiving the alignment guide pin of the first ferrule and for holding the first ferrule in alignment with the waveguide array.

18. An apparatus comprising:

an array of photonic optical sources;

an array of tapered multimode waveguide cores sandwiched between a pair of buffer layers and arranged so that each of the tapered cores is individually aligned and optically coupled adjacent to a respective member of the array of sources;

an array of photonic optical detectors;

an array of tapered multimode waveguide cores sandwiched between another pair of buffer layers and arranged so that each of the tapered cores is individually aligned and optically coupled adjacent to a respective member of the array of detectors;

a multimode optical fiber ribbon having a longitudinal dimension and first and second opposing extremities for transmission of light there through, wherein the source coupled waveguide array is in optical communication with the first extremity of the fiber ribbon and the detector coupled waveguide array is in optical communication with the second extremity of the fiber ribbon, wherein each of the multimode waveguide cores has a respective first optical aperture and a respective opposing optical aperture that are substantially different sizes;

a first fiber ribbon ferrule mechanically coupled with the first extremity of the fiber ribbon;

a cavity extending into an extremity of the source coupled waveguide array for receiving an alignment guide pin mechanically coupled with the first ferrule, and for holding the first ferrule in alignment with the waveguide array so that each of the tapered cores of the waveguide array is individually aligned and optically coupled adjacent to a respective fiber of the fiber ribbon;

a second fiber ribbon ferrule mechanically coupled with the second extremity of the fiber ribbon; and a cavity extending into an extremity of the detector coupled waveguide array for receiving an alignment guide pin mechanically coupled with the second ferrule, and for holding the second ferrule in alignment with the waveguide array, so that each of the tapered cores of the waveguide array is individually aligned and optically coupled adjacent to a respective fiber of the fiber ribbon.

* * * * *